United States Patent
Lin (10) Patent No.: US 6,747,800 B1
(45) Date of Patent: Jun. 8, 2004

(54) OPTICAL INTERFERENCE TYPE PANEL AND THE MANUFACTURING METHOD THEREOF

(75) Inventor: Wen-Jian Lin, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 46 days.

(21) Appl. No.: 10/249,061

(22) Filed: Mar. 13, 2003

(30) Foreign Application Priority Data

Dec. 27, 2002 (TW) .......................................... 91137637

(51) Int. Cl.$^7$ ................................................. G02B 1/10
(52) U.S. Cl. ....................................... 359/585; 359/588
(58) Field of Search ................................. 359/237, 245, 359/585, 586, 588, 589, 590

(56) References Cited

U.S. PATENT DOCUMENTS 6,392,781 B1 * 5/2002 Kim et al. .................. 359/248

* cited by examiner

Primary Examiner—Hung Xuan Dang
Assistant Examiner—Tuyen Tra
(74) Attorney, Agent, or Firm—Jiang Chyun IP Office (57) ABSTRACT

A manufacturing method for optical interference type panel is provided. A patterned supporting layer is formed on a transparent substrate, and then a first electrode layer and an optical film are formed sequentially on the supporting layer and the transparent substrate. A sacrificial material layer is formed on the optical layer, and then, a backside exposure process is performed by using the supporting layer as a mask to pattern the sacrificial material layer. A portion of the patterned sacrificial material layer is removed to expose the optical film above the supporting layer to form a sacrificial layer, and then a second electrode layer is formed on the sacrificial layer between the adjacent supporting layers and portion of the optical film. Afterwards, the sacrificial layer is removed.

20 Claims, 8 Drawing Sheets

OPTICAL INTERFERENCE TYPE PANEL AND THE MANUFACTURING METHOD THEREOF

CROSS REFERENCE TO RELATED APPLICATIONS

This application claims the priority benefit of Taiwan application serial no. 91137637, filed on Dec. 27, 2002.

BACKGROUND OF INVENTION

1. Field of Invention

The present invention generally relates to a panel display and a manufacturing method thereof, and more particularly, to an optical interference type panel and a manufacturing method thereof.

2. Description of Related Art

Thin and light-weight panel displays, such as a liquid crystal display (LCD), organic emitting diode (OLED) and plasma display panels (PDP) have been widely used in daily life now. Wherein, LCD is gradually becoming the mainstream of the display. However, LCD still has disadvantages, such as the view angle not being wide enough, the response time not being fast enough, the full-color being implemented by using the color filters, and the polarizer being mandatory which causes the problem of poor efficiency of utlization of the light source and the problem of the backlight module's consumption of more power.

An optical interference type panel has been currently developed., consisting primarily in a plurality of optical interference modulators arranged in array. The optical interference modulator primarily consists of a transparent electrode, a reflective electrode, and a supporting layer that supports the reflective electrode. With the support from the supporting layer, a specific air gap exists between the reflective electrode and the transparent electrode. After a light emits into the optical interference modulator via the transparent electrode, the light passes through the air gap and emits onto the second electrode. Then, the light is reflected from the second electrode via the transparent electrode. Since the light experiences different levels of interference in different air gaps, it shows light with different colors, e.g. a red light, a green light, and a blue light. Moreover, the reflective electrode in the optical interference modulator has to bind with the micro electro mechanical system (MEMS) for performing its design, so that the optical interference modulator can be switched between the on/off state and the objective of displaying can be achieved.

The optical interference type panel constituted by the optical interference modulators mentioned above is able to display appropriate color images without having to configure the color filters and the polarizer, so that the cost of the color filters can be saved. Moreover, the optical interference type panel constituted by the optical interference modulators mentioned above is also characterized by its low power consumption, fast response time, and being bi-stable. Therefore, it is advantageous for development of low power consumption products, such as the mobile phone, personal digital assistant (PDA), and e-book.

FIG. 1A to 1F schematically shows a sectional view of a manufacturing process for a conventional optical interference type panel. First, referring to FIG. 1A. a patterned first electrode layer 102, an optical film 103, and a sacrificial layer 104 are formed on a transparent layer 100. Wherein, the sacrificial layer 104 is made of a material of opaque molybdenum (Mo) or an alloy of molybdenum (Mo). Then, referring to FIG. 1B, a supporting material layer 106 and a negative type photoresist layer 108 are sequentially formed on the sacrificial layer 104. Then, referring to FIG. 1C, a backside expose process 110 and a develop process are performed by using the opaque sacrificial layer 104 as a mask to pattern the photoresist layer 108a. Then, referring to FIG. 1D, portion of the supporting layer 106 that are not covered by the photoresist layer 108a is removed by using the photoresist layer 108a as an etch mask, so as to form a supporting layer 106a. Then, referring to FIG. 1E, the photoresist layer 108a is removed, and a second electrode 112 is formed on the supporting layer 106a and the sacrificial layer 104 between the adjacent supporting layers 106a. Then, referring to FIG. 1F, a release process is performed, in which the $XeF_2$ gas is used as an etch, so that the sacrificial layer 104 is converted into a gas and is removed, so as to form a optical interference type panel constituted by a plurality of optical interference modulators that are arranged in array.

However, in the manufacturing method for the optical interference type panel mentioned above, the sacrificial layer 104 must be made of an opaque material, and must be removed by the release process. Therefore, the qualified material is limited, requiring the choice of molybdenum (Mo) or the alloy of molybdenum (Mo). However, using a lot of molybdenum (Mo) or an alloy of molybdenum (Mo) to form the sacrificial layer as mentioned above significantly increases the manufacturing costs.

SUMMARY OF INVENTION

To solve the problem mentioned above, the objective of the present invention is to provide an optical interference type panel and a manufacturing method thereof, so as to reduce the manufacturing costs of the optical interference type panel.

A further objective of the present invention is to provide an optical interference type panel and a manufacturing method thereof, so as to simplify the manufacturing process of the optical interference type panel.

A manufacturing method for optical interference type panel is provided by the present invention. A patterned supporting layer is formed on a transparent substrate, a first electrode layer is subsequently formed on the supporting layer and the transparent substrate, and then an optical film is formed on the first electrode layer. Then, a sacrificial layer is formed on the optical layer between the adjacent supporting layers. Wherein, the sacrificial layer formed is below the optical film above the supporting layer. Then, a second electrode layer is formed on the sacrificial layer between the adjacent supporting layers and portion of the optical film. Afterwards, the sacrificial layer is removed.

Moreover, according to the present invention, a sacrificial material layer may be formed on the optical film, and a portion of the sacrificial material layer is removed to expose the optical film above the supporting layer to form a sacrificial layer. Wherein, the sacrificial layer is below the optical film above the supporting layer.

Furthermore, according to the present invention, after the sacrificial material layer is formed, a backside exposure process may be processed by using the supporting layer as a mask so as to expose the optical film above the supporting layer.

The optical interference type panel provided by the present invention primarily comprises a transparent substrate, a patterned supporting layer, a first electrode, an optical film, and a second electrode. Wherein, the supporting layer is located on the transparent substrate. The first electrode is located on the transparent substrate and the supporting layer. The optical film is located on the first electrode, and the edge of the second electrode is located on portion of the optical film above the adjacent supporting layer.

From the preferred embodiment of the present invention mentioned above, the optical interference type panel of the present invention first forms the opaque supporting layer, and then sequentially forms the first electrode layer, the optical film, and the transparent sacrificial layer that is made of the photo resistant material. Moreover, the sacrificial layer may be made of material that is low cost and is suitable for the release process. Therefore, using molybdenum (Mo) or the alloy of molybdenum (Mo) to form the sacrificial layer is not mandatory, so that the manufacturing costs for the optical interference type panel are reduced.

Moreover, the optical interference type panel of the present invention directly uses the photoresist material to form the sacrificial layer. Therefore, the present invention is able to avoid the step of coating a photoresist layer on the supporting layer that is required in the prior art, so that the manufacturing process of the optical interference type panel is simplified.

Furthermore, according to the present invention, after the sacrificial material layer is formed on the optical film, the backside exposure process can be avoided, and the etch method can be directly applied to form the sacrificial form. Therefore, the manufacturing process of the optical interference type panel is further simplified.

In addition, according to the present invention, the sacrificial layer that is below the optical film above the supporting layer can be directly formed on the optical film between the adjacent supporting layers. Therefore, the manufacturing process of the optical interference type panel is further simplified.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIGS. 1A to 1F schematically shows a sectional view of a manufacturing process for a conventional optical interference type panel.

DETAILED DESCRIPTION

FIGS. 2A to 2F schematically shows a sectional view of a manufacturing process for an optical interference type panel of a preferred embodiment according to the present invention.

Figure 1A:
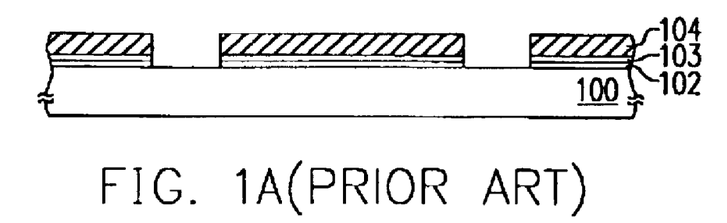
Figure 1B:
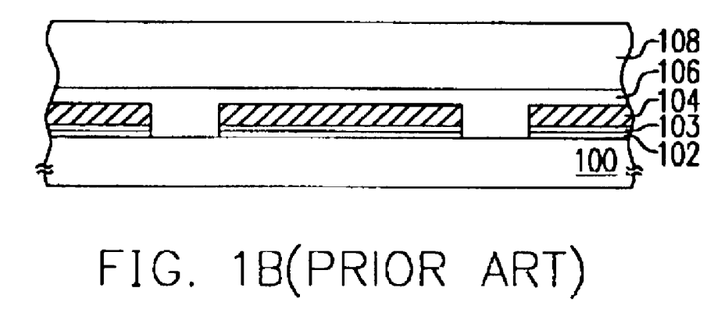
Figure 1C:
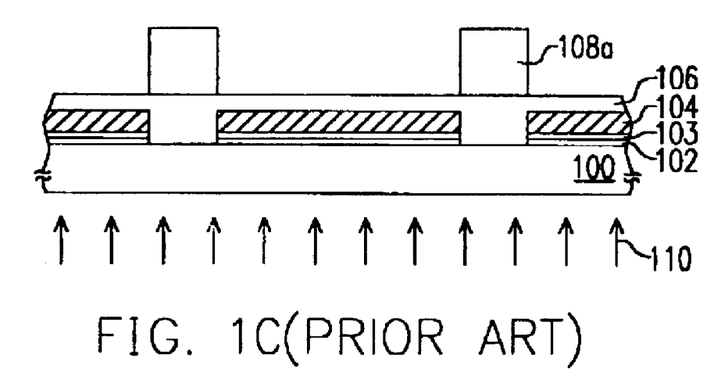
Figure 1D:
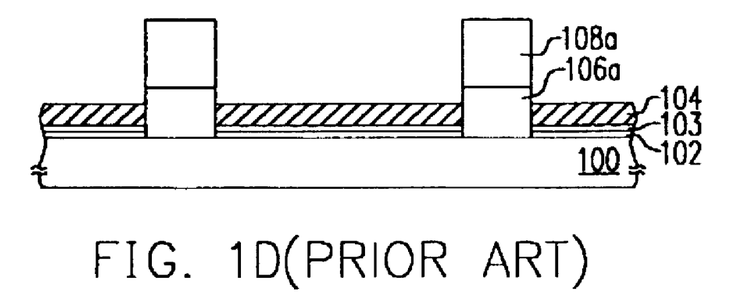
Figure 1E:
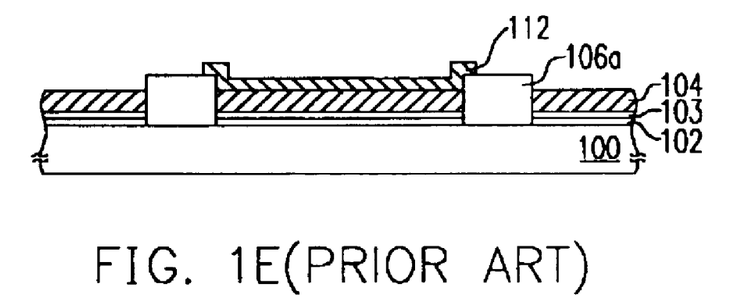
Figure 1F:
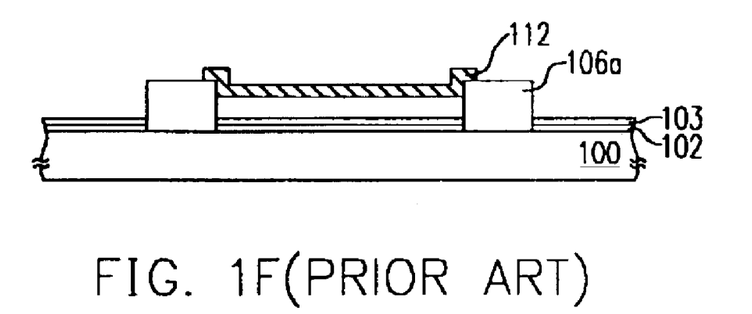
Figure 2A:
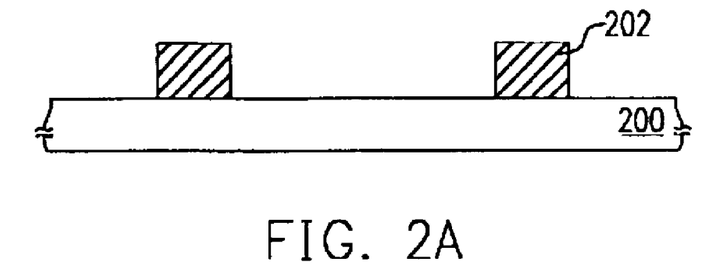
FIGS. 2A to 2F schematically shows a sectional view of a manufacturing process for an optical interference type panel of a preferred embodiment according to the present invention.

First, referring to FIG. 2A, a patterned supporting layer 202 is formed on a transparent substrate 200. Wherein, the transparent substrate 200 is made of glass or a transparent material. The supporting layer 202 is made of an opaque material such as an insulation material or a high-molecular resin. Moreover, a micro-etch method is used to form the patterned supporting layer 202.

Figure 2B:
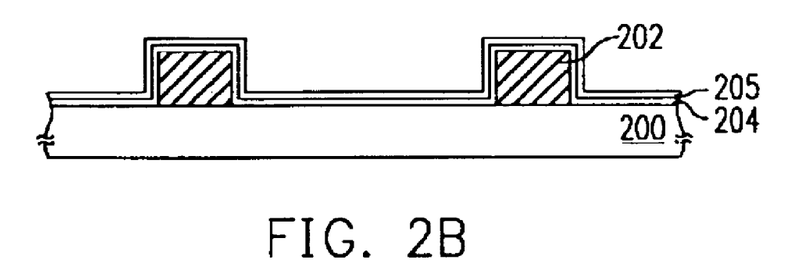

Then, referring to FIG. 2B, a first electrode layer 204 and an optical film 205 are sequentially formed on the transparent substrate 200 and the supporting layer 202. Wherein, the first electrode layer 204 is made of a transparent conductive material such as indium-tin oxide. Moreover, the optical film 205 is a multi-layering of the interleaving layer composed of the high-dielectric-constant material layers and low-dielectric-constant material layers.

Figure 2C:
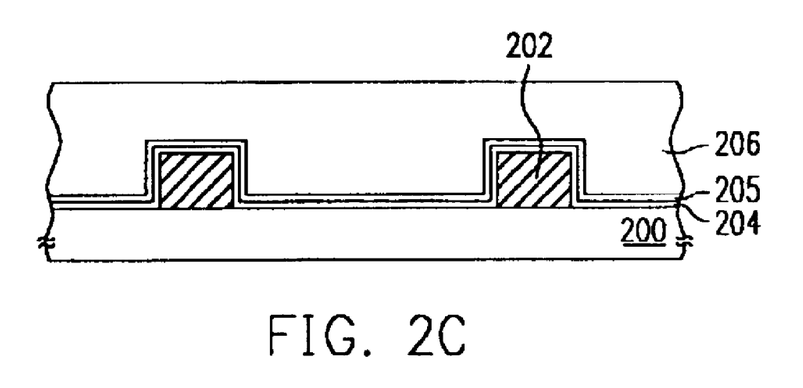

Then, referring to FIG. 2C, a sacrificial material layer 206 is formed on the optical film 205. Wherein, the sacrificial material layer 206 is made of a transparent material such as the negative type photoresist, and a spin on coating method is used to form the sacrificial material layer 206.

Figure 2D:
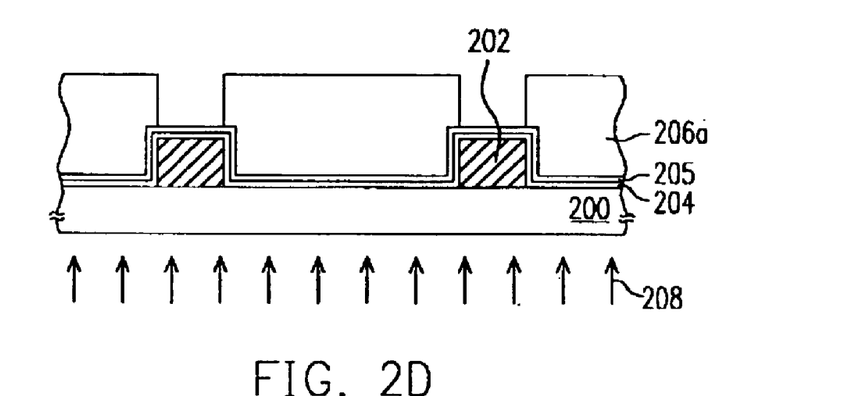

Then, referring to FIG. 2D, a backside exposure process 208 is performed by using the supporting layer 202 as a mask, so that a photochemistry effect occurs on the portion of the sacrificial material layer 206 that is not masked by the supporting layer 202. Afterwards, a developing and solidifying process is further performed to form the sacrificial material layer 206a that has an opening in it, and the opening of the sacrificial material layer 206a exposes the optical film 205 above the supporting layer 202.

Figure 2E:
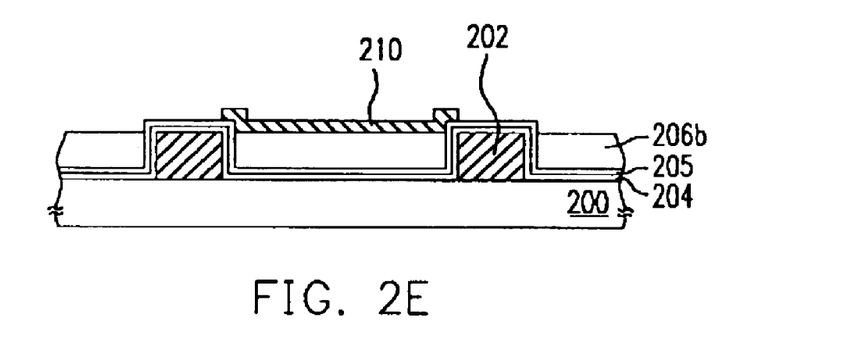

Then, referring to FIG. 2E, part of the sacrificial material layer 206a is removed so as to form a sacrificial layer 206b. Wherein, an etching method is used to remove the sacrificial material layer 206a. Preferably, a nonisotropic etching method is used and the formed sacrificial layer 206b is below the optical film 205 above the supporting layer 202, so that the sacrificial layer 206b is formed on the optical film 205 between the adjacent supporting layers 202. A second electrode layer 210 is subsequently formed on the sacrificial layer 206b between the adjacent supporting layers 202 and the portion of the optical film 205 above the supporting layer 202. Preferably, the second electrode layer 210 is made of a material that is opaque and has good extendibility and mechanical characteristic, such as metal. To be noted, since the second electrode layer 210 is formed on the optical film 205, and the optical film 205 is an insulator. Therefore, the second electrode 210 is not electrically connected to the first electrode layer 204 so as to maintain the normal operation of the elements.

Figure 2F:
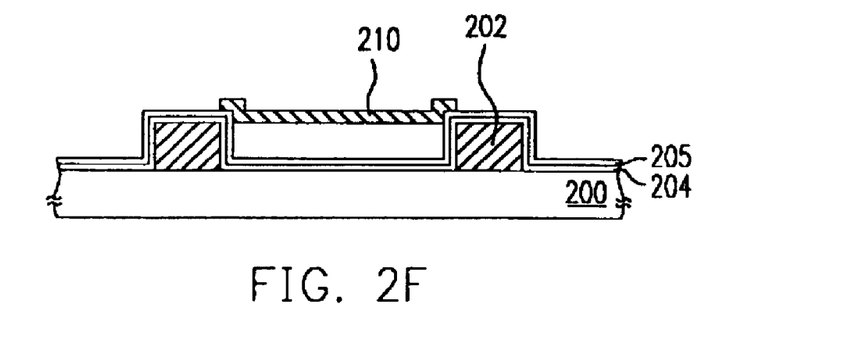

Then, referring to FIG. 2F, the optical interference type panel is constituted by the optical interference modulators formed by removing all sacrificial layers 206b. For example, the release process is used to remove the sacrificial layer 206b.

In addition to the manufacturing methods mentioned above, another manufacturing method also can be used by the present invention. FIGS. 3A to 3F schematically shows a sectional view of a manufacturing process for an optical interference type panel of another preferred embodiment according to the present invention.

Figure 3A:
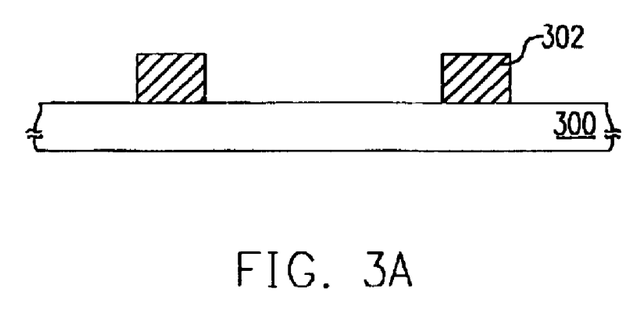
FIGS. 3A to 3F schematically shows a sectional view of a manufacturing process for an optical interference type panel of another preferred embodiment according to the present invention.

First, referring to FIG. 3A, a patterned supporting layer 302 is formed on a transparent substrate 300. Wherein, the transparent substrate 300 is made of glass or transparent resin. The supporting layer 302 is made of an opaque material such as an insulation material or a high-molecular resin. Moreover, a micro-etch method is used to form the patterned supporting layer 302.

Figure 3B:
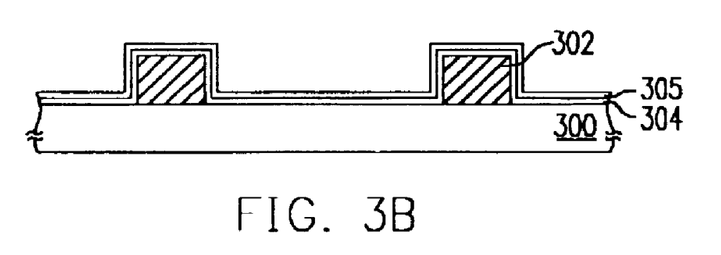

Then, referring to FIG. 3B, a first electrode layer 304 and an optical film 305 are sequentially formed on the transparent substrate 300 and the supporting layer 302.

Wherein, the first electrode layer 304 is made of a transparent conductive material such as indium-tin oxide. Moreover, the optical film 305 is such as the multi-layers of the interleaving layer composed of the high-dielectric-constant material layers and low-dielectric-constant material layers.

Figure 3C:
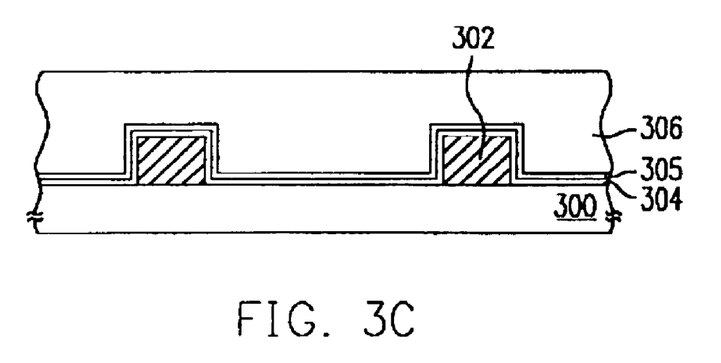

Then, referring to FIG. 3C, a sacrificial material layer 306 is formed on the optical film 305, and the sacrificial material layer 306 is solidified via a solidifying process. Wherein, the sacrificial material layer 306 is made of a transparent material such as photoresistor, and a spin on coating method is used to form the sacrificial material layer 306.

Figure 3D:
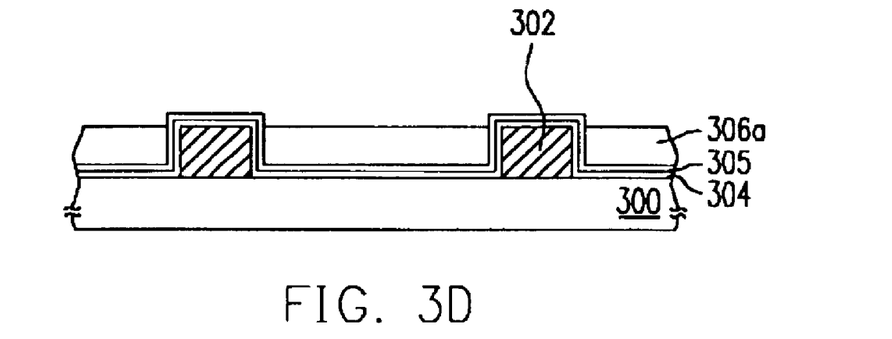
Figure 3E:
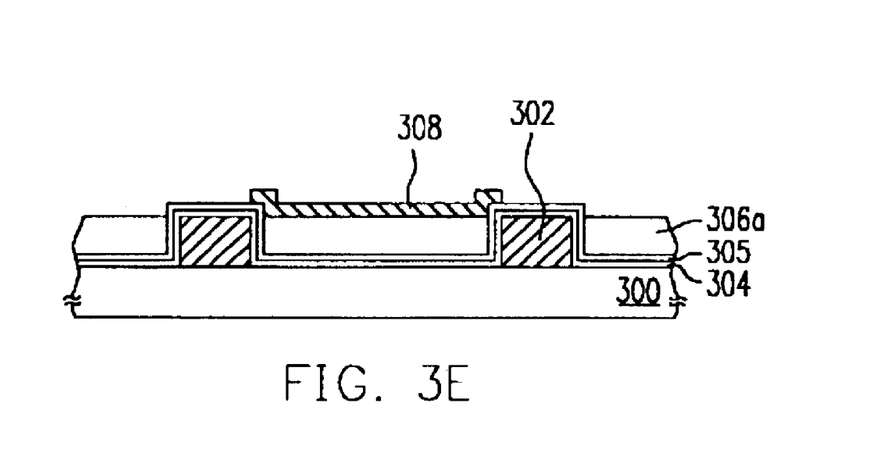

Then, referring to FIG. 3D, part of the sacrificial material layer 306 is removed so as to form a sacrificial layer 306a. The sacrificial layer 306a exposes the optical film 305 above the supporting layer 302. Moreover, the sacrificial layer 306a is below the optical film 305 above the supporting layer 302, so that the sacrificial layer 306a is formed on the optical film 305 between the adjacent supporting layers 302. Wherein, an etch back method is used to remove part of the sacrificial material layer 306a. A second electrode layer 308 is subsequently formed on the sacrificial layer 306a between the adjacent supporting layers 302 and the portion of the optical film 305 above the supporting layer 302. Preferably, the second electrode layer 308 is made of a material that is opaque and has good extendibility and mechanical characteristic, such as metal. Similarly, the second electrode layer 308 is formed on the optical film 305 of the first electrode layer 304. Therefore, the second electrode 308 is not electrically connected to the first electrode layer 304 so as to maintain the normal operation of the elements.

Figure 3F:
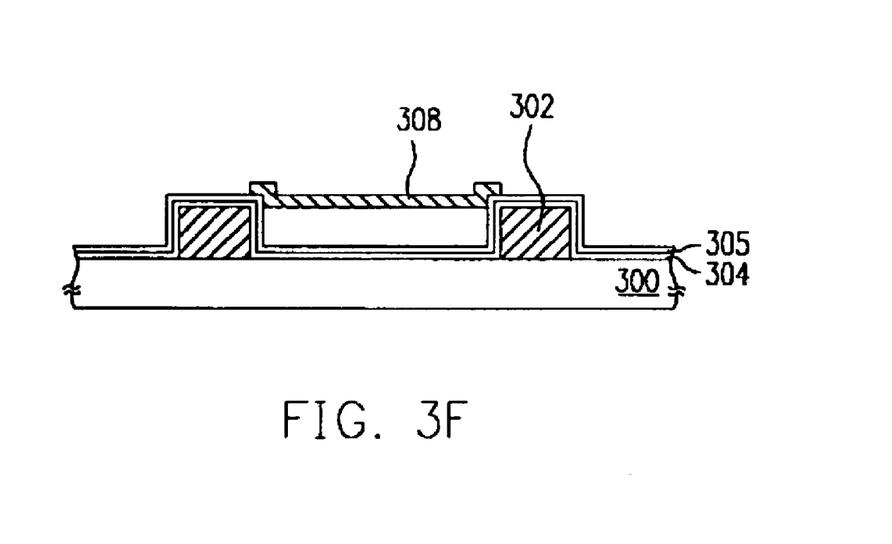

Then, referring to FIG. 3F, the optical interference type panel is constituted by the optical interference modulators formed by removing all sacrificial layers 306a. For example, the release process is used to remove the sacrificial layer 306a.

Besides the manufacturing methods mentioned above, another manufacturing method also can be used by the present invention. FIGS. 4A to 4E schematically shows a sectional view of a manufacturing process for an optical interference type panel of another preferred embodiment according to the present invention.

Figure 4A:
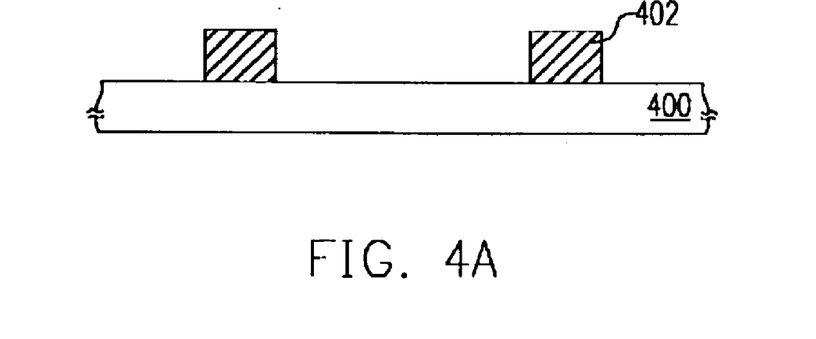
FIGS. 4A to 4E schematically shows a sectional view of a manufacturing process for an optical interference type panel of another preferred embodiment according to the present invention.

First, referring to FIG. 4A, a patterned supporting layer 402 is formed on a transparent substrate 400. Wherein, the transparent substrate 400 is made of glass or transparent resin. The supporting layer 402 is made of an opaque material such as an insulation material or a high-molecular resin. Moreover, a micro-etch method is used to form the patterned supporting layer 402.

Figure 4B:
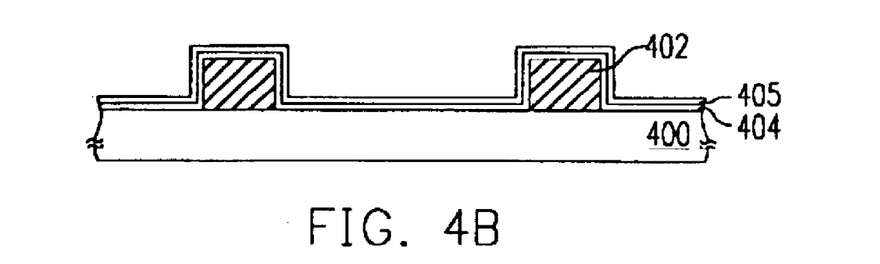

Then, referring to FIG. 4B, a first electrode layer 404 and an optical film 405 are sequentially formed on the transparent substrate 400 and the supporting layer 402. Wherein, the first electrode layer 404 is made of a transparent conductive material such as indium-tin oxide. Moreover, the optical film 405 is such as the multi-layers of the interleaving layer composed of the high-dielectric-constant material layers and low-dielectric-constant material layers.

Figure 4C:
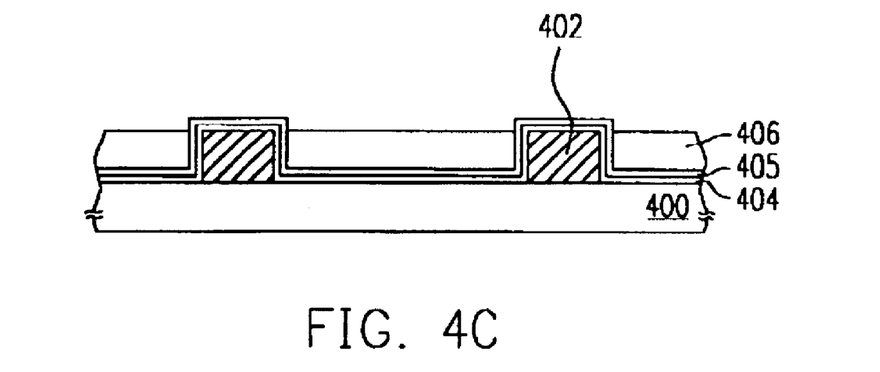

Then, referring to FIG. 4C, a sacrificial layer 406 is formed on the optical film 405, and the sacrificial layer 406 is solidified via a solidifying process. Wherein, the sacrificial layer 406 exposes the optical film 405 above the supporting layer 402. Moreover, the sacrificial layer 406a is below the optical film 405 above the supporting layer 402, so that the sacrificial layer 406 is formed on the optical film 405 between the adjacent supporting layers 402. Moreover, the sacrificial material layer 406 is made of a transparent material such as photoresist. A spin on coating method and a flat technique are used to form the sacrificial material layer 406, and the thickness of the sacrificial material layer 406 is formed on the optical form 405 above the supporting layer 402. Then, a slightly $O_2$ plasma etch for surface treatment is performed so as to remove the tiny sacrificial material layer that is residual on the optical film 405 above the supporting layer 402, and to obtain the structure as shown in FIG. 4C.

Figure 4D:
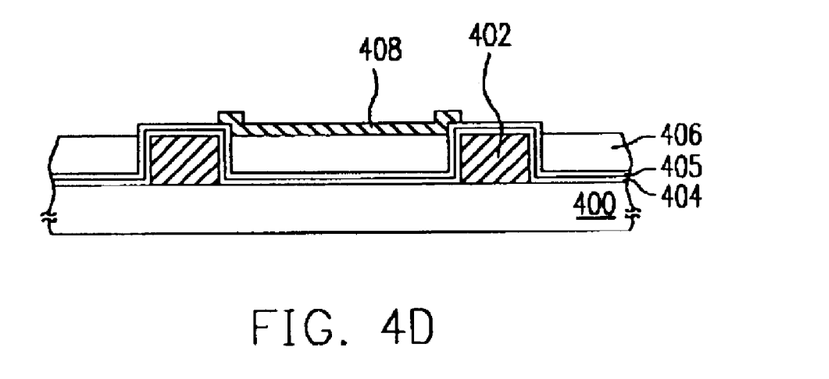

Then, referring to FIG. 4D, a second electrode layer 408 is subsequently formed on the sacrificial layer 406 between the adjacent supporting layers 402 and the portion of the optical film 405 above the supporting layer 402. Preferably, the second electrode layer 408 is made of a material that is opaque and has good extendibility and mechanical characteristic, such as metal. Similarly, the second electrode layer 408 is formed on the optical film 405 of the first electrode layer 404. Therefore, the second electrode 408 is not electrically connected to the first electrode layer 404 so as to maintain the normal operation of the elements.

Figure 4E:
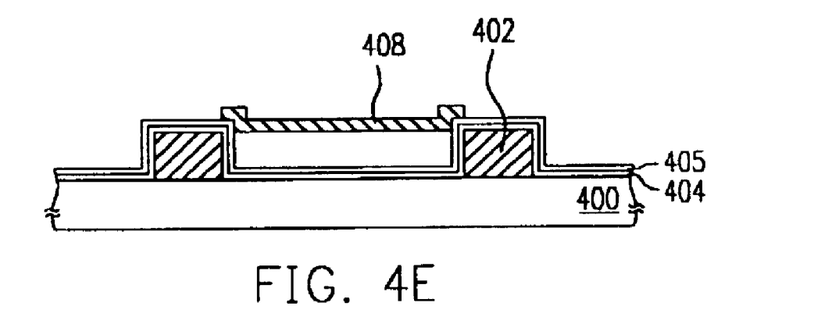

Then, referring to FIG. 4E, the optical interference type panel is constituted by the optical interference modulators formed by removing all sacrificial layers 406. For example, the release process is used to remove the sacrificial layer 406.

In order to apply the release process, utilization of the photoresist material is quite suitable. In addition, various appropriate materials such as conventional dielectric material can be used. Therefore, the present invention is able to choose low cost material to form the sacrificial layer.

Figure 5:
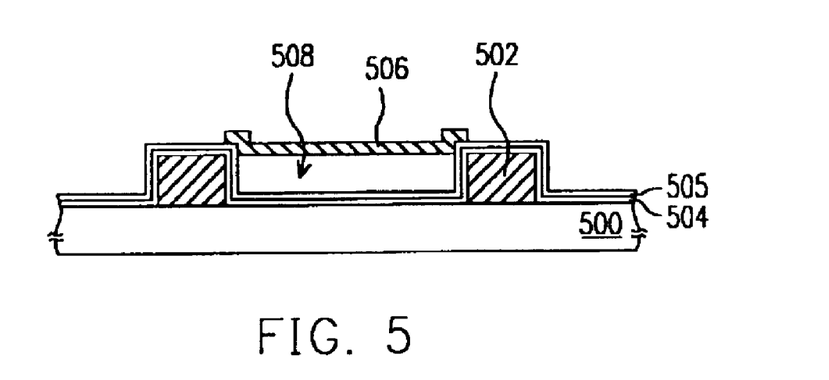
FIG. 5 schematically shows a structure sectional view of an optical interference type panel of a preferred embodiment according to the present invention.

FIG. 5 schematically shows a structural sectional view of an optical interference type panel of a preferred embodiment according to the present invention. Generally speaking, an optical interference type panel is formed by deploying a plurality of optical interference modulators on the transparent substrate with an array style. However, for simplifying, only one optical interference modulator is shown in FIG. 5. Referring to FIG. 5, the optical interference modulator inside the optical interference type panel according to the present invention primarily comprises a transparent substrate 500, a supporting layer 502, a first electrode 504, an optical film 505, and a second electrode 506.

The supporting layer 502 is located on the transparent substrate 500. Wherein, the supporting layer 502 is made of an opaque material such as an insulation material or a high-molecular resin.

The first electrode layer 504 is located on the transparent substrate 500 and the supporting layer 502. Wherein, the first electrode layer 504 is made of a transparent conductive material such as indium-tin oxide and formed on the transparent substrate 500 and the supporting layer 502.

The optical film 505 is located on the first electrode layer 504, and the optical film 505 is such as the multi-layers of the interleaving layer composed of the high-dielectric-constant material layers and low-dielectric-constant material layers.

The edge of the second electrode 506 is individually located on the optical film 505 above the supporting layer 502, and an air gap 508 is formed between the second electrode 506 and the optical film 505. Preferably, the second electrode layer 506 is made of a material that is opaque and has good extendibility and mechanical characteristic.

The method for driving the optical interference type panel mentioned above is the same as the one used in the prior art. That is, the pixel (optical interference modulator) in the same row is driven by the first electrode in the same row, and the pixel in the same column is driven by the second electrode in the same column. In other words, when a specific pixel in the pixel array is driven, the first electrode in the pixel's corresponding row and the second electrode in the pixel's corresponding column are driven.

In summary, the present invention has at least the following advantages:

1. The optical interference type panel of the present invention first forms the opaque supporting layer, and then sequentially forms the first electrode layer, the optical film, and the transparent sacrificial layer that is made of photoresist material. Moreover, the sacrificial layer may be made of material that Is low cost and is suitable for the release process. Therefore, using molybdenum (Mo) or the alloy of molybdenum (Mo) to form the sacrificial layer is not required, so that the manufacturing costs for the optical interference type panel are reduced.

2. Moreover, the optical interference type panel of the present invention directly uses the photoresist material to form the sacrificial layer. Therefore, the present invention is able to avoid the step of coating a photoresist layer on the supporting layer that is required in the prior art, so that the manufacturing process of the optical interference type panel is simplified.

3. Furthermore, according to the present invention, after the sacrificial material layer is formed on the optical film, the backside exposure process can be avoided, and the etch method can be directly applied to form the sacrificial form. Therefore, the manufacturing process of the optical interference type panel is further simplified.

4. In addition, according to the present invention, the sacrificial layer that is below the optical film above the supporting layer can be directly formed on the optical film between the adjacent supporting layers. Therefore, the manufacturing process of the optical interference type panel is further simplified.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A manufacturing method for optical interference type panel, comprising:

forming a patterned supporting layer on a transparent substrate;

forming a first electrode layer on the transparent substrate and the supporting layer;

forming an optical film on the first electrode layer;

forming a sacrificial layer on the optical film between the adjacent supporting layers;

forming a second electrode layer on the sacrificial layer between the adjacent supporting layers and the portion of the optical layer; and removing the sacrificial layer.

2. The manufacturing method for optical interference type panel of claim 1, wherein the supporting layer is made of an opaque material.

3. The manufacturing method for optical interference type panel of claim 2, wherein the supporting layer is made of either an insulation material or a group composed of the high-molecular resin.

4. The manufacturing method for optical interference type panel of claim 1, wherein the sacrificial layer is made of a photo resistant material.

5. The manufacturing method for optical interference type panel of claim 1, wherein a spin on coating method is used to form the sacrificial layer.

6. The manufacturing method for optical interference type panel of claim 1, wherein the sacrificial layer is below the optical film above the supporting layer.

7. The manufacturing method for optical interference type panel of claim 6, wherein after a sacrificial layer is formed on the optical film between the adjacent supporting layers, a slightly $O_2$ plasma etch for surface treatment is further performed onto the sacrificial layer and the optical film, so as to remove the sacrificial layer on the optical layer above the supporting layer.

8. The manufacturing method for optical interference type panel of claim 1, wherein the first electrode layer is made of a transparent material.

9. The manufacturing method for optical interference type panel of claim 1, wherein the optical film is formed by interleaving a plurality of high-dielectric-constant material layers and low-dielectric-constant material layers.

10. The manufacturing method for optical interference type panel of claim 1, wherein the method for forming the sacrificial layer comprises:

forming a sacrificial material layer on the optical film; and removing a portion of the sacrificial material layer to expose the optical film above the supporting layer so as to form the sacrificial layer, wherein the sacrificial layer is below the optical layer above the supporting layer.

11. The manufacturing method for optical interference type panel of claim 10, wherein an etching method is used to remove the sacrificial material layer to expose the optical film above the supporting layer so as to form the sacrificial layer.

12. The manufacturing method for optical interference type panel of claim 11, wherein after a sacrificial material layer is formed on the optical film, and before the portion of the sacrificial material layer is removed to expose the optical film above the supporting layer so as to form the sacrificial layer, further comprises a backside exposure process to pattern the sacrificial material layer.

13. The manufacturing method for optical interference type panel of claim 1, wherein the second electrode layer is made of a metal material.

14. The manufacturing method for optical interference type panel of claim 1, wherein the method for removing the sacrificial layer comprises a release process.

15. An optical interference type panel, comprising:

a transparent substrate;

a supporting layer, located on the transparent substrate;

a first electrode, located on the transparent substrate and the supporting layers;

an optical film, located on the first electrode; and a second electrode, wherein an edge of the second electrode is located on the portion of the optical film above the adjacent supporting layer.

16. The optical interference type panel of claim 15, wherein the supporting layer is made of an opaque material.

17. The optical interference type panel of claim 15, wherein the supporting layer is made of either an insulation material or a group composed of a high-molecular resin.

18. The optical interference type panel of claim 15, wherein the first electrode layer is made of a transparent material.

19. The optical interference type panel of claim 15, wherein the optical film is formed by interleaving a plurality of high-dielectric-constant material layers and low-dielectric-constant material layers.

20. The optical interference type panel of claim 15, wherein the second electrode layer is made of a metal material.

* * * * *